(12) United States Patent
Kuehne

(10) Patent No.: US 11,003,333 B2
(45) Date of Patent: May 11, 2021

(54) METHODS FOR SELECTING A SECTION OF TEXT ON A TOUCH-SENSITIVE SCREEN, AND DISPLAY AND OPERATOR CONTROL APPARATUS

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 715 days.

(21) Appl. No.: 15/105,852

(22) PCT Filed: Dec. 1, 2014

(86) PCT No.: PCT/EP2014/003205
§ 371 (c)(1),
(2) Date: Jun. 17, 2016

(87) PCT Pub. No.: WO2015/090514
PCT Pub. Date: Jun. 25, 2015

(65) Prior Publication Data
US 2016/0320947 A1 Nov. 3, 2016

(30) Foreign Application Priority Data
Dec. 19, 2013 (DE) ..................... 10 2013 021 576.5

(51) Int. Cl.
*G06F 40/10* (2020.01)
*G06F 40/166* (2020.01)
(Continued)

(52) U.S. Cl.
CPC ........ *G06F 3/04842* (2013.01); *G06F 3/0482* (2013.01); *G06F 3/0488* (2013.01);
(Continued)

(58) Field of Classification Search
CPC ............... G06F 3/0482; G06F 3/04842; G06F 3/04883; G06F 17/24
See application file for complete search history.

(56) References Cited

U.S. PATENT DOCUMENTS 6,154,757 A * 11/2000 Krause .................. G06F 3/0219
715/205
6,181,344 B1 1/2001 Tarpenning et al.
(Continued)

FOREIGN PATENT DOCUMENTS

| | | |
|---|---|---|
| CN | 1302398 A | 7/2001 |
| DE | 199 14 242 A1 | 10/2000 |

(Continued)

OTHER PUBLICATIONS

German Office Action for Application No. 102013021576.5 dated Sep. 24, 2014.
(Continued)

*Primary Examiner* — Arpan P. Savla
*Assistant Examiner* — Haimei Jiang
(74) *Attorney, Agent, or Firm* — Staas & Halsey LLP

(57) ABSTRACT

A predetermined touch action is performed by a user at a location on a touch-sensitive screen. The location is registered and associated with presentation content. If at least the first condition that the associated presentation content includes at least one portion of an uninterrupted character unit is satisfied, then at least one first selection menu is presented. The menu items from the first selection menu provide a selection option between the uninterrupted character unit and at least one second unit of text associated with the uninterrupted character unit as at least one element from the group includes a sentence and paragraph. Selection of a first menu item involves the uninterrupted character unit, (Continued)

and selection of a second menu item involves the second unit of text, being selected as the section of text to be selected.

9 Claims, 4 Drawing Sheets

(51) Int. Cl.
*G06F 3/0488* (2013.01)
*G06F 3/0482* (2013.01)
*G06F 3/0484* (2013.01)
*G06F 40/117* (2020.01)

(52) U.S. Cl.
CPC ...... *G06F 3/04845* (2013.01); *G06F 3/04883* (2013.01); *G06F 40/10* (2020.01); *G06F 40/117* (2020.01); *G06F 40/166* (2020.01)

(56) References Cited

U.S. PATENT DOCUMENTS

| | | | |
|---|---|---|---|
| 8,255,830 B2 | 8/2012 | Ording et al. | |
| 2004/0177317 A1* | 9/2004 | Bradstreet | G06F 16/40 715/202 |
| 2008/0034043 A1* | 2/2008 | Gandhi | G06Q 10/00 709/206 |
| 2008/0158170 A1 | 7/2008 | Herz et al. | |
| 2008/0209355 A1* | 8/2008 | Lee | G06Q 10/107 715/767 |
| 2010/0235770 A1* | 9/2010 | Ording | G06F 1/1626 715/765 |
| 2011/0035383 A1* | 2/2011 | Ghimire | G10L 13/00 707/748 |
| 2012/0306772 A1* | 12/2012 | Tan | G06F 3/0488 345/173 |
| 2013/0019175 A1* | 1/2013 | Kotler | G06F 3/0482 715/728 |
| 2013/0091467 A1* | 4/2013 | Pallakoff | G06F 3/0482 715/835 |
| 2013/0124989 A1 | 5/2013 | Doan et al. | |
| 2013/0227474 A1 | 8/2013 | Dondurur et al. | |
| 2014/0026055 A1* | 1/2014 | Cohn | G06F 3/04883 715/727 |

FOREIGN PATENT DOCUMENTS

| | | |
|---|---|---|
| DE | 695 19 905 T2 | 6/2001 |
| DE | 102013021576.5 | 12/2013 |
| EP | 1 674 977 A2 | 12/2005 |
| EP | 2 669 779 A1 | 12/2013 |
| WO | PCT/EP2014/003205 | 12/2014 |

OTHER PUBLICATIONS

Matthias Rauterberg; "Interaction Design Menu", 2002; found Nov. 3, 2016 at www.idemployee.id.tue.nl/g.w.m.rauterberg/lecturenotes/ID%20lecture-3/ID%20lecture-3.PPT; pp. 1-70.
International Search Report for PCT/EP2014/003205 dated Feb. 16, 2015.
Office Action dated Jun. 29, 2018 in corresponding Chinese Patent Application No. 201480069169.0, 12 pp.
English translation of International Preliminary Report on Patentability for PCT/EP2014/003205 dated Jun. 23, 2016.

* cited by examiner

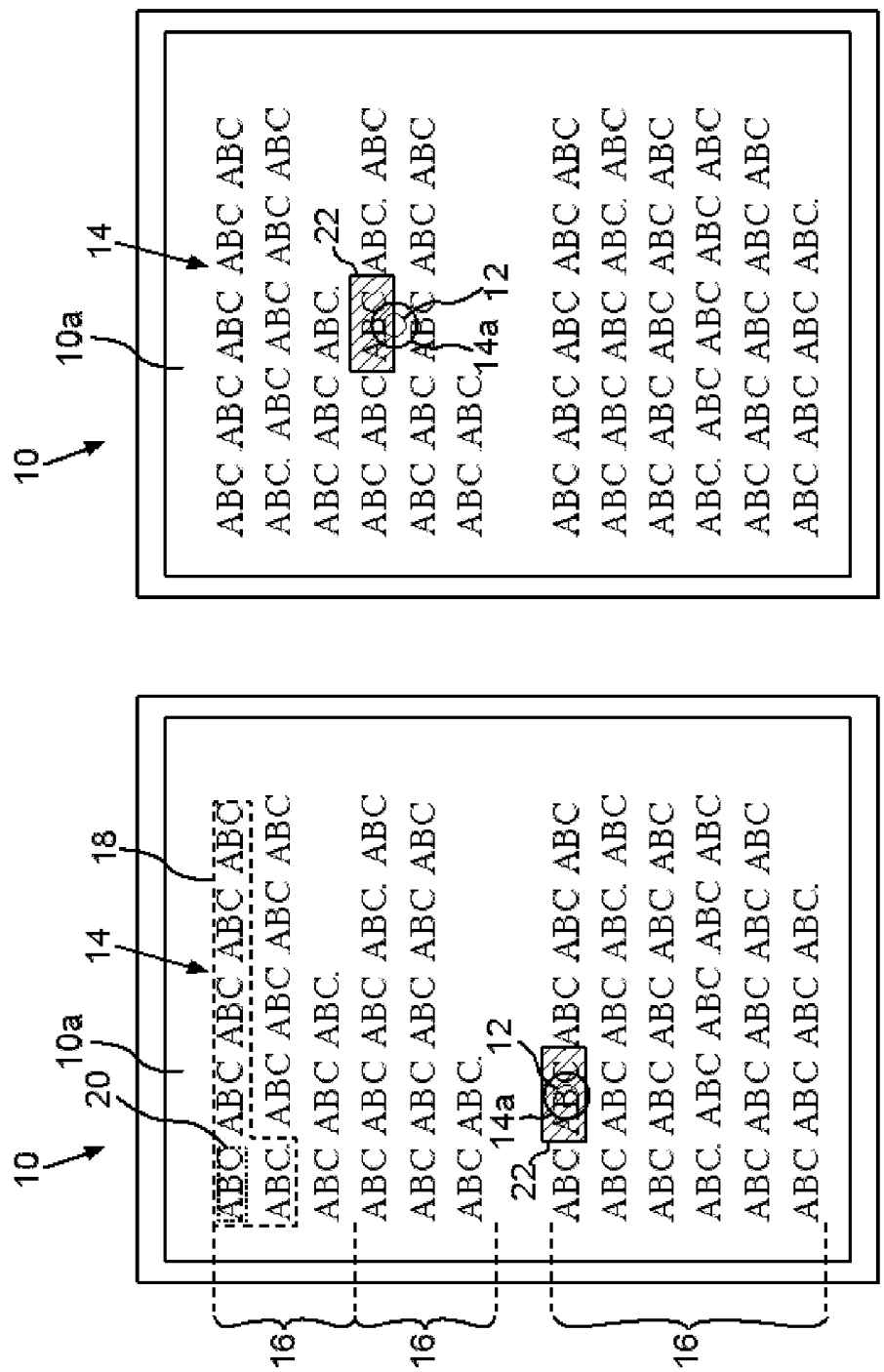

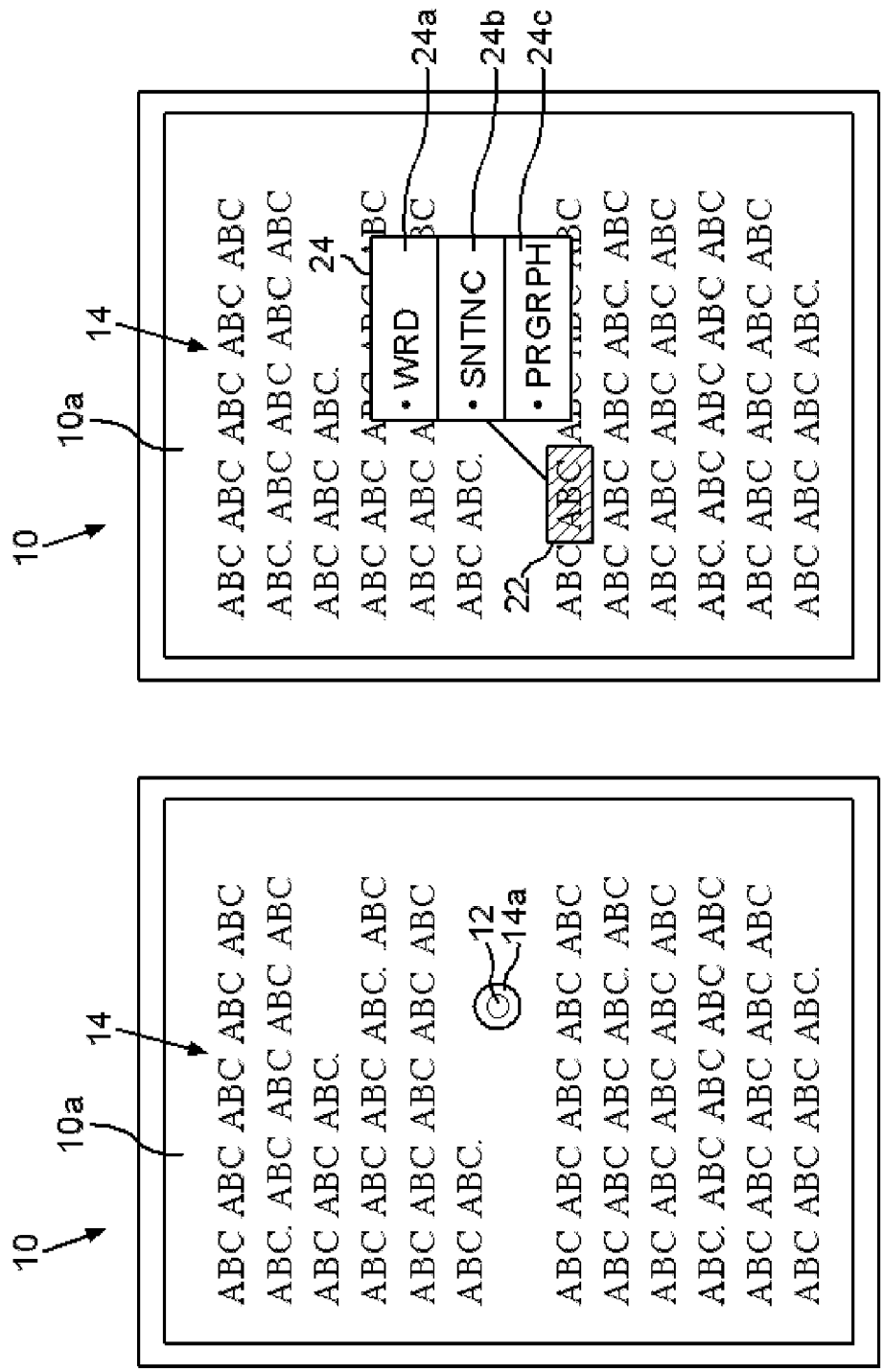

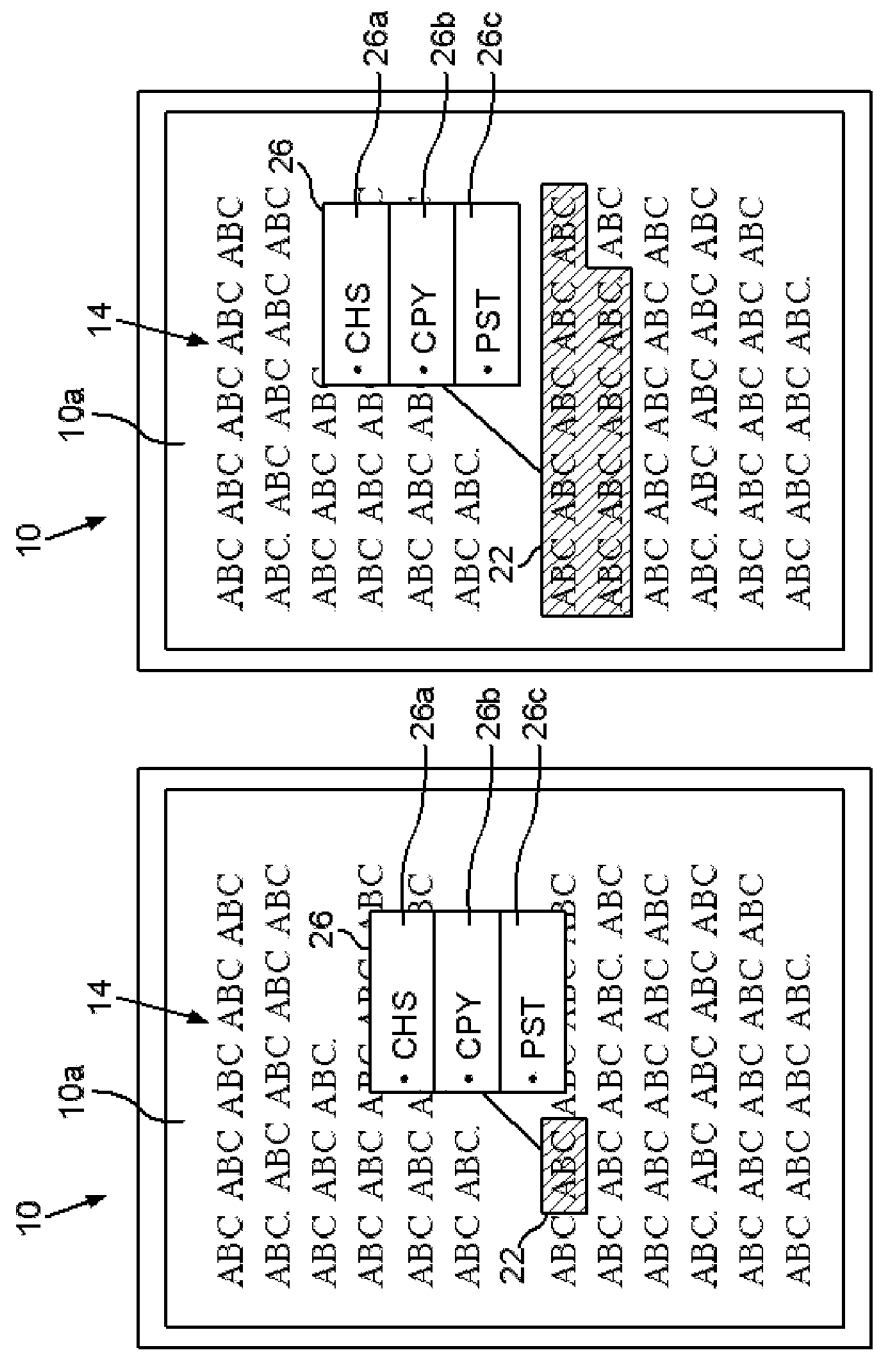

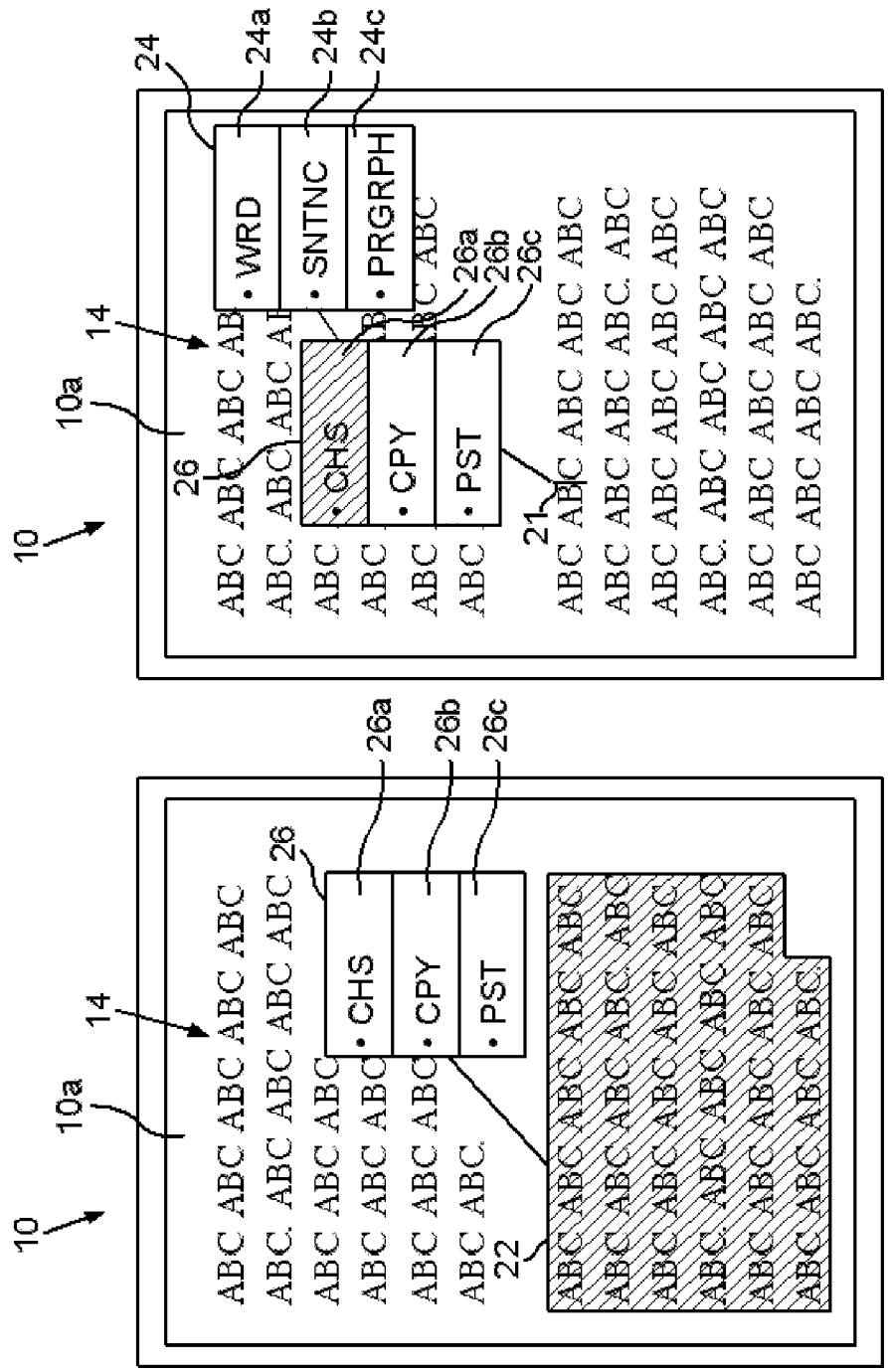

METHODS FOR SELECTING A SECTION OF TEXT ON A TOUCH-SENSITIVE SCREEN, AND DISPLAY AND OPERATOR CONTROL APPARATUS

CROSS REFERENCE TO RELATED APPLICATIONS

This application is the U.S. national stage of International Application No. PCT/EP2014/003205, filed Dec. 1, 2014 and claims the benefit thereof. The International Application claims the benefit of German Application No. 102013021576.5 filed on Dec. 19, 2013, both applications are incorporated by reference herein in their entirety.

BACKGROUND

Described below are a method for selecting a section of text from a text presented on a touch-sensitive screen at least as part of a presentation and a display and operator control apparatus having a touch-sensitive screen.

Touch-sensitive display and operator control apparatuses today, such as e.g. also mobile devices with touch-based operation such as smartphones, tablet PCs, E-books, etc., are being used more and more often to edit complex texts. This can involve e.g. sections of text being marked and being processed further by selecting further functions that are provided.

By way of example, US 2013/0091467 A1 describes a method for controlling menu options in which a section of text from a text displayed on a touchscreen can be selected by a user. After the section of text has been selected, a menu appears with multiple menu items and an icon that represents the section of text. The user can drag the marked text to one of the menu items. Subsequently, the selected menu item has a submenu displayed for it, from which various subfunctions can be selected.

There are likewise methods known, as described e.g. in DE 695 19 905 T2, for selecting a desired section of text that is to be processed further. In this context, DE 695 19 905 T2 describes a method for marking text on a display screen in a personal communication device. When a user touches the screen at a particular location, a start position for the marker is stipulated. If the touch is then maintained for a predetermined time, a marking mode is activated. In the marking mode, the user can then move his finger, with the text over which the finger is moved being marked. When a user stops touching the screen, the marking mode is terminated. The marked text is displayed to the user in a popup window and can be processed further. If the text that is intended to be marked is not all presented in the current presentation on the screen, then this method is user unfriendly, however, for the following reasons. Touch-sensitive display screens, such as e.g. those of smartphones, are relatively small, which means that it frequently arises that a text is not presented as a whole on the screen, but rather only a section is presented and the presentation can be moved through the whole text by scrolling. If, by way of example, a longer section of text needs to be marked that is not displayed as a whole in the current presentation, then scrolling is also required during the marking process. A known measure in this case is e.g. to initiate automatic scrolling when e.g. the finger of a user touching the screen approaches the bottom or top edge of the presentation. Marking of text in accordance with DE 695 19 905 T2 is highly susceptible to error in this case, however. If the automatic scrolling is carried out e.g. too quickly, then it is highly probable that too large a section of text is marked undesirably and the user has to perform the marking process again, or at least one very long time is taken before the desired section of text is ultimately marked. If the automatic scrolling is performed too slowly, then marking of a longer section of text is likewise very laborious. If the user inadvertently takes his finger from the screen briefly during the marking process, then the marking mode is terminated and the user has to perform the marking process again.

SUMMARY

The embodiments provide a method for selecting a section of text from a text presented on a touch-sensitive screen at least as part of a presentation and a display and operator control apparatus having a touch-sensitive screen that provide a way of selecting a section of text that is as convenient as possible for a user.

This method includes selecting a section of text from a text presented on a touch-sensitive screen at least as part of a presentation.

The method is used to select a section of text from a text presented on a touch-sensitive screen at least as part of a presentation, where the text includes a plurality of first units of text and at least one second unit of text that is superordinate to the first units of text, where additionally each first unit of text is an uninterrupted character unit having at least one respective character, and the at least one second unit of text is at least one element from the group including sentence and paragraph, and where each first unit of text is associated with precisely one second unit of text. The method according to the embodiments involves a predetermined touch action performed by a user at a location on the screen, and the location, being registered and the registered location on the screen being associated with a presentation content from the presentation, which presentation content is presented at least at this location on the screen. In addition, if at least the first condition that the associated presentation content includes at least one portion of a first unit of text is satisfied, then at least one first selection menu having a plurality of menu items associated with the first selection menu is presented on the screen. In this case, the menu items provide a selection option between the first unit of text and at least one second unit of text associated with the first unit of text, where selection of a first menu item from the menu items by a user involves the first unit of text being selected as the section of text to be selected and where selection of a second menu item from the menu items by the user involves the second unit of text being selected as the section of text to be selected.

The presentation of the first selection menu and the selection functions provided as a result are therefore a simple way of allowing a user to determine, by selecting a menu item, which section of text is intended to be selected, that is to say, by way of example, whether the uninterrupted character unit, such as e.g. a word, that has been touched or the whole sentence or the whole section is intended to be selected. In this case, it is irrelevant whether the sentence or the section, for example, goes beyond the current presentation on the screen. This firstly provides a particularly simple and convenient way for a user to select a desired section of text in a particularly simple manner, and also this manner of providing the selection option means that there is also no need for the presentation to be scrolled. This decreases the susceptibility of the selection method to error and at the same time increases control convenience for the user. In addition, units of text such as words, sentences and paragraphs can easily be identified on the basis of the internationally similar text structure, which therefore also allows particularly simple and inexpensive implementation of the method according to the embodiments. Furthermore, specifically also units of text such as words, sentences or paragraphs are sections of text that are marked most frequently from experience, e.g. in contrast to individual sentence sections or sections of text with arbitrary starts and ends. In this way, it is thus possible to significantly increase control convenience when a user wishes to mark or select one of these units of text.

In this case, the touch-sensitive screen, such as e.g. a touchscreen, may be part of a display and operator control apparatus, such as e.g. of a mobile telephone, particularly of a smartphone, a PDA or a tablet PC, a Notebook or a display and operator control apparatus with a touchscreen that is situated in the motor vehicle.

The predetermined touch action performed by a user may in this case be predetermined arbitrarily in general, such as e.g. as brief tapping of the screen, as repeated tapping, as a predetermined multitouch contact or as moving touch action or a predetermined touching gesture. The predetermined touch action may be a static, i.e., a nonmoving, touch of the screen. A static touch for selecting a desired section of text is particularly intuitive in this case. In addition, it is advantageous if a predetermined touch action is predetermined as a static touch lasting for a predetermined period. Since the touch needs to last for a predetermined period in order to be registered as a predetermined touch action by the display and operator control device, any, possibly even unintended, touch of the screen is advantageously prevented from immediately leading to a window or selection menu being opened.

In addition, the presentation content that is assigned to the touch location does not necessarily have to have its physical extent limited to the touch location. By way of example, the presentation content can also be assigned to the touch location such that the assigned presentation content represents the content of the presentation from a region of the screen that includes the touch location and extends e.g. up to a prescribed maximum distance from the touch location around the touch location. As a result, if a user slightly misses the point in the text that he wished to touch, it is possible for this touch action not to immediately be rated as a failed attempt by the display and operator control device.

The uninterrupted character unit having at least one character may be a word and/or a number and/or a symbol and/or a symbol chain. In this case, the uninterrupted character unit may be delimited from further character units by an interruption, e.g. in the form of a space, a line break and/or a punctuation mark, which precede and succeed the character unit. In this case, the character unit itself has no interruption, i.e. it contains particularly none of the cited interruptions, such as no space or gap.

Furthermore, each first unit of text may be associated with precisely one second unit of text by virtue of the respective uninterrupted character unit being arranged in the sentence and/or paragraph with which it is associated. In this case, it is also possible for multiple first units of text to be associated with a second unit of text. If a sentence/paragraph includes multiple words, for example, then each word in this sentence/paragraph is associated with this sentence/paragraph. This advantageously takes account of the fact that a user who wishes to select a sentence or paragraph will intuitively touch a character unit in this sentence or paragraph rather than another point in the text outside the desired sentence or paragraph.

In a further advantageous refinement of the embodiments, if at least the first condition is satisfied, then at least one second selection menu is presented on the screen, from which functions can be selected by a user. Thus, the user is advantageously provided with the opportunity to process a selected section of text further. Thus, when at least one first function from the functions is carried out, after selection thereof by a user, the selected section of text may be used. In addition, provision may be made for the selection of a predetermined function from the functions of the second selection menu to involve the presentation of the first selection menu being prompted. In this case, functions provided by the second selection menu may be the functions "select", which can be used to select a section of text and which can prompt particularly also the presentation of the first selection menu for selecting the section of text, "copy", which can be used to copy a selected section of text, "insert", which can be used to insert e.g. another section of text at the selected location, "erase", which can be used to erase a selected section of text, "cut", which can be used to remove a selected section of text, and the like, for example. These functions are particularly advantageous in this case if, as described, the first selection menu can additionally be used to select the section of text, whether the word, the sentence, or the paragraph, with which the relevant function is intended to be performed. It is thus also particularly advantageously possible for more selection options to be provided for the functions.

In this context, the terms "first" selection menu and "second" selection menu are intended only to indicate that these are two different selection menus, but these terms do not stipulate a chronological order for the presentation of these selection menus.

In this case, provision may be made for the second selection menu to be displayed at a time after or before the first selection menu is displayed. In other words, in one refinement of the embodiments, a user can use the first selection menu to first of all select which section of text is intended to be used for a further function and, at a time subsequent thereto, can use the second selection menu to select which function is intended to be performed with the selected section of text. Conversely, in a further refinement of the embodiments, it is also possible for the second selection menu, which is thus presented at a time before the first selection menu, to be used first by a user to select which function is intended to be performed, and following selection of a function, the chronologically subsequent presentation of the first selection menu can be used by the user to select which section of text is intended to be used for performing the function. In this case, provision may additionally be made for not every function of the second selection menu to use a selected section of text when it is performed. In this case, it is additionally advantageous for the first selection menu to be displayed at a time subsequent to the second selection menu only when a function has been selected from a second selection menu by a user that uses a selected section of text from the presented text when it is performed, or a function has been selected whose performance involves the first selection menu being presented.

Both variants have advantages depending on the situation and depending on the application in this case. If, for example in an application, the selecting of a word, sentence or paragraph is a selection that is made very frequently, then it is advantageous to present the first selection menu first in time and, only after a selection has been made by a user, to present the second selection menu for selecting a function to be performed with the selected section of text. Above all, this also has the advantage that, after the unit of text has been selected as the section of text, the selected section of text can be identified e.g. to the user to the user as visual feedback for the selected section of text by a marker, particularly before the second selection menu is presented and hence before a function is performed. An incorrect selection of the selected section of text can thus easily be recorded and corrected by a user immediately. If, on the other hand, the second selection menu, for example, provides many functions whose performance involves no selected section of text at all using the presented text, it is advantageous for the second selection menu to be displayed first of all and for the first selection menu to be displayed only when a function has been selected whose performance requires the use of a selected section of text or a function has been selected whose performance involves the first selection menu being presented. Furthermore, it may be that the selection of a word, sentence or paragraph is used less frequently for particular applications, giving way to a free selection option, which is as variable as possible, for a section of text for further processing. In this case, it is advantageous if, by way of example, first the second selection menu is presented and only in the event of the selection of a single particular function, e.g. the "select" function 26a, the first selection menu is presented at a subsequent time, and the selection of another function from the second selection menu involves the first selection menu not being presented but rather e.g. a section of text previously selected on a variable basis manually by touch being used for the performance of the selected function or no section of text at all from the presented text being used, such as e.g. for the "insert" function. The embodiments therefore allows many refinement options, and hence options for adaptation to suit numerous different situations and applications.

A further advantageous refinement of the embodiments is, as already described in part, when the first selection menu is presented only if, in addition to the first condition that the associated presentation content includes at least one portion of a first unit of text, the second condition that a predetermined function from the second selection menu has been selected by a user is satisfied, where particularly performance of the predetermined function that is brought about by selection of this predetermined function by a user involves the first selection menu being presented. This implies that the second selection menu is presented first in time, i.e. as soon as the display and operator control device establishes that the first condition is satisfied. This refinement has the advantages already described previously, e.g. when many functions are provided by the second selection menu whose performance involves no selected section of text at all using the presented text or when a section of text selected previously on a variable basis manually by touch is intended to be used for performing the selected function.

In a further advantageous refinement of the embodiments, if at least the first condition is satisfied, then the first unit of text is marked. It is thus advantageously possible for a user to immediately identify whether the marked unit of text corresponds to the one that he also wished to touch by means of his touch action. In this case, the marker can be provided such that a marker such as e.g. a frame or a colored identification is presented that includes the first unit of text. The marker may also be provided such that instead of the touch, a bar, such as e.g. a cursor bar, is presented.

Furthermore, if the second menu item from a first selection menu is selected by the user, then at least the portion of the second unit of text that is currently presented on the screen can be marked, e.g., by a marker that includes this at least one portion of the second unit of text. If the user thus uses the first selection menu to make a particular selection for a word, a sentence or a paragraph, then this allows him to have his selection that he has made displayed immediately. If the user has tapped incorrectly, for example, then the marker immediately makes him aware of the fact. If the paragraph that the user has selected using the first selection menu is not currently presented on the screen in its entirety, for example, then at least the portion of the paragraph that can be seen on the current presentation is presented as marked. Since a marker for a paragraph typically has a larger surface area than that for just a single word or sentence, a user can advantageously also tell from the marker presented only in part whether it corresponds to his desired selection for a word, sentence or paragraph, particularly without necessarily having to scroll in this case.

In a further advantageous refinement of the embodiments, when the screen is touched by a user in a region of a boundary for the presented marker and there is a subsequent touching movement by the user on the screen in one direction, the presented boundary for the marker is shifted at least to some extent in the direction. This advantageously additionally provides a user with the option of marking an arbitrarily variable section of text, i.e. one that is not linked to a complete sentence or paragraph, and, in particular, selecting the thus marked section of text for use with further functions. This is particularly advantageous because in this way the first selection menu thus firstly provides a user with the option of selecting from the uninterrupted character unit, the sentence and the paragraph, as the section of text to be selected, in a manner that is as fast and convenient as possible, and secondly, if the user still wishes to use a more variable selection option, he is likewise provided with the selection option.

The display and operator control apparatus according to the embodiments includes a touch-sensitive screen. The display and operator control apparatus is designed in the case of a text, presented on the screen at least as part of a presentation, having a plurality of first units of text and at least one second unit of text that is superordinate to the first units of text, to register a predetermined touch action performed by a user at a location on the screen, and the location. In this case each first unit of text is an uninterrupted character unit having at least one respective character and where the at least one second unit of text is at least one element from the group including sentence and paragraph, and where each first unit of text is associated with precisely one second unit of text. The display and operator control apparatus is additionally designed to associate the registered location on the screen with a presentation content from the presentation, which presentation content is presented at least at this location on the screen, to check whether at least the first condition that the associated presentation content includes at least one portion of a first unit of text is satisfied, and if at least the first condition is satisfied, to present at least one first selection menu having a plurality of menu items associated with the first selection menu on the screen. Furthermore the display and operator control apparatus is designed to use the menu items to provide a selection option between the first unit of text and at least one second unit of text associated with the first unit of text, where the display and operator control apparatus is additionally designed to select the first unit of text as the section of text to be selected on a selection of a first menu item from the menu items by a user and to select the second unit of text as the section of text to be selected on the selection of a second menu item from the menu items by the user.

The features, combinations of features and advantages thereof that are cited for the method according to the embodiments and the refinements thereof apply in the same manner to the display and operator control apparatus according to the embodiments. Furthermore, the method according to the embodiments and the refinements of the method allow the development of the display and operator control apparatus according to the embodiments by further substantive features.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1a shows a schematic illustration of a display and operator control apparatus having a touch-sensitive screen to illustrate the association of a first touch location, touched by a user, on the screen with a presentation content, where the first touch location is situated on a presented uninterrupted character unit;

FIG. 1b shows a schematic illustration of a display and operator control apparatus having a touch-sensitive screen to illustrate the association of a second touch location, touched by a user, on the screen with a presentation content, where the second touch location is situated between two uninterrupted character units;

FIG. 1c shows a schematic illustration of a display and operator control apparatus having a touch-sensitive screen to illustrate the association of a third touch location, touched by a user, on the screen with a presentation content, where the touch location is situated at a great distance from the presented text;

FIG. 2 shows a schematic illustration of a display and operator control apparatus with the first selection menu, which is presented as a result of the touch action shown in FIG. 1a, particularly with a text section selection menu having the menu items "WRD" (Word) for selecting an uninterrupted character unit, "SNTNC" (Sentence) for selecting a sentence and "PRGRPH" (Paragraph) for selecting a paragraph in accordance with an exemplary embodiment;

FIG. 3a shows a schematic illustration of a display and operator control apparatus having a function selection menu that is presented on the screen and that, in accordance with one exemplary embodiment, is presented as a result of the touch action shown in FIG. 1a or that, in accordance with a further exemplary embodiment, is presented as a result of a selection, previously made by a user, of the menu item "WRD" to select an uninterrupted character unit from the text section selection menu shown in FIG. 2;

FIG. 3b shows a schematic illustration of a display and operator control apparatus having a function selection menu that is presented on the screen and that, as a result of a selection, previously made by a user, of the menu item "SNTNC", is presented in order to select a sentence from a text section selection menu shown in FIG. 2 as an exemplary embodiment;

FIG. 3c shows a schematic illustration of a display and operator control apparatus having a function selection menu that is presented on the screen and that, as a result of a selection, previously made by a user, of the menu item "PRGRPH", is presented in order to select a paragraph from the text section selection menu shown in FIG. 2 as an exemplary embodiment; and FIG. 4 shows a schematic illustration of a display and operator control apparatus having a function selection menu that is presented on the screen and that, in accordance with one exemplary embodiment, is presented as a result of the touch action shown in FIG. 1a, and having the text section selection menu, which continues to be presented as a result of a selection, previously made by a user, of the menu item "CHS" (Choose) from the function selection menu.

DETAILED DESCRIPTION OF THE PREFERRED EMBODIMENT

Reference will now be made in detail to the preferred embodiments, examples of which are illustrated in the accompanying drawings, where like reference numerals refer to like elements throughout.

FIGS. 1a, 1b and 1c show schematic illustrations of a display and operator control apparatus 10 having a touch-sensitive screen 10a to illustrate the association of touch location 12 with a presentation content 14a. In this case, the touch-sensitive screen presents a presentation 14 with text that includes multiple paragraphs 16, particularly three paragraphs 16. In addition, each paragraph 16 comprises multiple sentences 18, only one sentence 18 being provided with a reference symbol in this case by way of example. In addition, each sentence 18 comprises multiple uninterrupted character units 20 that each have at least one character that can present particularly words and/or numbers and/or symbol chains and/or individual symbols. The uninterrupted character units 20 are presented as ABC in this case by way of example, again only one character unit 20 being provided with a reference symbol by way of example.

If a user now wishes to select a section of text from this presented text, he first of all needs to touch a point in the section of text to be selected on the screen 10a. When a user does so by performing a predetermined touch action at a touch location 12 on the screen 10a, the touch and the location 12 at which the touch takes place are registered by the display and operator control apparatus 10. In this case, the predetermined touch action may be predetermined as a static touch with the predetermined minimum period, particularly such that the touch action by the user needs to last at least for the predetermined period in order to be registered as such by the display and operator control apparatus 10 so that not every, possibly unintentional, touch immediately leads to a selection window being opened. The registered touch location 12 is then associated with the presentation content 14a at least at this touch location 12. In these examples, the presentation content 14a is associated with the touch location 12 such that the associated presentation content 14a presents the content of the presentation 14 from a region of the screen 10a that includes the touch location 12 and extends up to a prescribed maximum distance from the touch location 12 around the touch location 12. In this way, it is also possible for words/numbers/symbols to be selected when they are not hit exactly by a user by touch. In the example in FIG. 1a, the presentation content 14a in this case includes a portion of an uninterrupted character unit 20. In this case, the uninterrupted character unit 20 is identified by a marker 22 that comprises the uninterrupted character unit 20. Additionally or alternatively, it is also possible for a bar 21 to be presented at the touch location 12, as shown e.g. in FIG. 4. In the example in FIG. 1b, the touch location 12 is situated between two closest uninterrupted character units 20. In this case, according to a predetermined specification, the uninterrupted character unit 20 to be marked can be determined by the display and operator control apparatus 10, e.g. the character unit 20 that is closest to the touch location 12 is determined.

In this case, FIG. 1c shows an example in which the presentation content 14a at the touch location 12 does not includes part of an uninterrupted character unit 20, as a result of which no marker 22 is provided and the display and operator control apparatus 10 also does not perform a further function, such as the presentation of a selection menu.

Thus, when the display and operator control apparatus 10 registers a touch by a user and a touch location 12, and when the presentation content 14a at this touch location 12 has at least one portion of an uninterrupted character unit 20, the uninterrupted character unit 20 is marked and, in accordance with one exemplary embodiment, at the same time a text section selection menu 24 in the form of a selection window is presented, as e.g. in FIG. 2 and, in accordance with another exemplary embodiment, at the same time a function selection menu 26 is presented, as e.g. in FIG. 3a.

In this case, FIG. 2 shows a first selection menu, presented as a result of the touch shown in FIG. 1a, that in this case is a text section selection menu 24 having the menu items "WRD" (Word) 24a, "SNTNC" (Sentence) 24b and "PRGRPH" (Paragraph) 24c. This text section selection menu 24 allows a user to select which section of text is intended to be selected for use for performing further functions. When the user selects the menu item "WRD" 24a, for example, only the uninterrupted character unit 20 with the marker 22, that is to say the character unit 20 that has been assigned to the touch location 12, is selected for use for a further function to be performed, particularly regardless of whether the uninterrupted character unit 20 is a word, a number, a symbol and/or a symbol chain. When the user selects the menu item "SNTNC" 24b, for example, the sentence 18 that contains the marked character unit 20 is selected, and when the user selects the menu item "PRGRPH" 24c, for example, the whole paragraph 16 that contains the marked character unit 20 is selected. In this case, further menu items may also be provided, such as e.g. "whole text", in order to select the whole text, and/or "line", to select the whole line of text that contains the marked character unit 20, etc. When one of the menu items from the text section selection menu 24 is selected, a second selection menu in the form of a function selection menu 26 is presented, as shown by FIGS. 3a, 3b and 3c.

FIG. 3a shows the case in which, according to FIG. 2, the menu item "WRD" 24a has been selected by a user. In this case, the marker 22 for the character unit 20 is retained and the function selection menu 26 is presented. FIG. 3b shows the case in which, according to FIG. 2, the menu item "SNTNC" 24b has been selected by a user. In this case, the whole sentence 18 that contains the previously marked, as in FIG. 2, character unit 20 with a marker 22 is presented and the function selection menu 26 is displayed. FIG. 3c shows the case in which, according to FIG. 2, the menu item "PRGRPH" 24c has been selected by a user. In this case, the whole paragraph 16 that contains the previously marked, as in FIG. 2, character unit 20 with a marker 22 is presented and the function selection menu 26 is displayed. The adaptation of the marker 22, depending on the selected menu item from the text section selection menu 24, thus provides a simple way of displaying to a user which section of text he has selected for use for performing further functions.

The function selection menu 26 shown in FIGS. 3a, 3b and 3c then allows a user to select from various functions, such as e.g. "CHS" (Choose) 26a, "CPY" (Copy) 26b and "PST" (Paste) 26c. In this case, there may also be other functions additionally or alternatively presented for selection, such as e.g. "cut", "erase" and/or a "further functions" menu item in order to list further functions, e.g. that are not required as often, and to provide them for a user for selection.

When a user now selects the menu item "CPY" 26b, for example, the selected section of text can be copied e.g. to a clipboard and is then available for insertion at a different location. When e.g. the menu item "PST" 26c is selected, it is possible for e.g. a section of text previously copied to a clipboard, possibly from another text or from the same text, to be inserted at the marked location at the selected section of text. When the menu item "CHS" 26a is selected, any further functions that use the selected section of text for their execution can be displayed in the presentation 14.

Furthermore, provision may also be made for the text section selection menu 24 not to be displayed first followed by the function selection menu 26, but rather the other way round, for the function selection menu 26 to be displayed first in time followed by the text section selection menu 24, so that, by way of example, a touch action by a user as shown in FIG. 1a is first of all followed by presentation 14 of the function selection menu 26 as shown in FIG. 3a, and only after selection of a function is there a presentation 14 of the text section selection menu shown in FIG. 2. In this case, provision may also be made for the text section selection menu 24 to be presented only when a particular function from the function selection menu 26 is selected, e.g. only when the function "CHS" 26a has been selected by a user, performance of which particularly involves presentation of the first selection menu. Furthermore, a selection menu that is displayed first in time can be hidden following selection of a menu item and the next selection menu can be shown or the first selection menu presented can continue to be shown.

FIG. 4 shows a further exemplary embodiment. According to this example, an operator control action by a user, e.g. as shown in FIG. 1a, is first of all followed by the function selection menu 26 being presented. In this case, the function selection menu 26 again comprises the functions "CHS" 26a, "CPY" 26b and "PST" 26c. In this context, provision is now made for the text section selection menu 24 to be displayed only when the function "CHS" 26a is selected from a function selection menu 26 by a user, e.g. by tapping on or briefly touching it, and selection of one of the functions "CPY" 26b or "PST" 26c does not involve the text section selection menu 24 being displayed. In addition, the presentation of the function selection menu 26 may also have provision for presentation to involve identification to a user of which functions are currently available and which are not. E.g. a faded presentation of the menu item "CPY" 26b can indicate that this function is currently not available. In this example, a touch action as shown in FIG. 1a is not followed by the provision of a marker 22 for the touched character unit 20 but rather by the presentation of a bar 21 at the touch location 12. When a user selected e.g. the function "PST" 26c, a previously copied object/text is inserted at this location. Since, in this case, the presented bar 21 does not relate to selection of a section of text, the function "CPY" 26b is also not available in this case. When a user selects the function "CHS" 26a as shown, for example, the text section selection menu 24 is then presented. At the same time, the function selection menu 26 continues to be represented in this example. When a user now selects a unit of text as section of text from a text selection menu 24, the text section selection menu 24 can be hidden again and the selected section of text marked. In this case, the function selection menu can continue to be presented, now additionally with the function "CPY" 26b as a currently available function, since a section of text has now been selected. A user can now select from the function selection menu 26 a function that uses the selected section of text, or can select the section of text again.

In addition, provision may also be made for a user to be able to make an arbitrarily variable selection for a section of text that is to be selected. By way of example, a user can touch the screen 10a in a region of a boundary for a presented marker 22, such as that of a word, sentence 18 or paragraph 16, and can perform a subsequent touching movement on the screen 10a in a desired direction, e.g. upward, downward, to the left or to the right. In this case, the touch in a region of the boundary of the marker 22 and the movement are registered by the display and operator control apparatus 10, and the display and operator control apparatus 10 shift the presented boundary for the marker 22 at least partly in this direction prescribed by the movement. A user thus has a free choice between manual arbitrarily variable selection of a section of text and "fast selection" using the text section selection menu 24. Furthermore, the selection can also be changed and varied or manually modified a text section selection made using the text section selection menu 24 by touching movement on the screen 10a.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for selecting a section of text presented on a touch-sensitive screen at least as part of a presentation, comprising:
   storing in a storage the text including a plurality of first text units and at least one second text unit superordinate to the first text units, each first text unit being an uninterrupted character string having at least one character, and the at least one second text unit including at least one of a sentence and a paragraph, each first text unit, capable of selection, being associated in the storage with precisely one second text unit;
   registering a predetermined touch action performed by a user at a location on the touch-sensitive screen and the location;
   associating the location on the touch-sensitive screen with presentation content from the presentation, as associated presentation content presented at least at the location registered on the touch-sensitive screen;
   presenting on the touch-sensitive screen, when at least a first condition that the associated presentation content includes at least one portion of a first text unit is satisfied, at least one first selection menu from which functions can be selected by the user;
   presenting on the touch-sensitive screen, when a predetermined function from the at least one first selection menu has been selected by the user, at least one second selection menu having a plurality of menu items that provide a selection option between the first text unit, as a first potential selection, and at least the second text unit, associated with the first text unit, as a second potential selection; and
   receiving an indication of selection by the user of one of a first menu item from among the menu items indicating the first text unit as the section of text selected, and a second menu item from among the menu items indicating the second text unit as the section of text to be selected.

2. The method as claimed in claim 1, wherein the uninterrupted character string having at least one character is one of a word, a numeral, a non-alphabetic symbol, a symbol chain, the word and the numeral, the numeral and the non-alphabetic symbol and the non-alphabetic symbol and the symbol chain.

3. The method as claimed in claim 1, wherein each first text unit is associated with precisely one second text unit by virtue of the uninterrupted character string being arranged in the at least one of the sentence and the paragraph with which the first text unit is associated.

4. The method as claimed in claim 3, wherein when at least one first function from the functions is carried out, after selection thereof by the user, the selected section of text is used.

5. The method as claimed claim 4, wherein the second selection menu is displayed at a time before the first selection menu is displayed.

6. The method as claimed in claim 1, further comprising marking, when at least the first condition is satisfied, the first text unit.

7. The method as claimed in claim 1, further comprising marking, when the second menu item from the first selection menu is selected by the user, at least a portion of the second text unit currently presented on the touch-sensitive screen.

8. The method as claimed in claim 7, further comprising shifting, when the touch-sensitive screen is touched by the user in a region of a boundary for a marker with a subsequent touching movement by the user on the touch-sensitive screen in one direction, a boundary for the marker is shifted in the one direction.

9. A display and operator control apparatus, comprising:
   a touch-sensitive screen;
   a storage storing first text units and at least one second text unit superordinate to the first text units, each first text unit being an uninterrupted character string of at least one character capable of selection by a user, the at least one second text unit including at least one of a sentence and a paragraph, and each first text unit being associated in the storage with precisely one second text unit; and
   a hardware processor programmed
      to register a location on the touch-sensitive screen where a predetermined touch action is performed by a user,
      to control display of the text, presented on the touch-sensitive screen at least as part of a presentation, having a plurality of the first text units and the at least one second text unit superordinate to the plurality of the first text units,
      to associate the location registered on the touch-sensitive screen with associated presentation content from the presentation at the location on the touch-sensitive screen,
      to check whether at least a first condition that the associated presentation content includes at least one portion of a first text unit is satisfied,
      to present on the touch-sensitive screen, when at least the first condition is satisfied, at least one first selection menu having a plurality of menu items,
      to provide a selection option between the first text unit and at least the second text unit associated with the first text unit using the menu items, to select the first text unit as a section of text to be selected when a first menu item from among the menu items is selected by the user, and
to select the second text unit as the section of text to be selected when a second menu item from among the menu items is selected by the user.

\* \* \* \* \*

UNITED STATES PATENT AND TRADEMARK OFFICE
CERTIFICATE OF CORRECTION

PATENT NO. : 11,003,333 B2  
APPLICATION NO. : 15/105852  
DATED : May 11, 2021  
INVENTOR(S) : Marcus Kuehne Page 1 of 1

It is certified that error appears in the above-identified patent and that said Letters Patent is hereby corrected as shown below:

On the Title Page

Item [54], Line 1 (approx.):
Delete "METHODS" and insert -- METHOD --, therefor.

In the Specification

Column 1, Line 1:
Delete "METHODS" and insert -- METHOD --, therefor.

In the Claims

Column 12, Line 8:
In Claim 2, delete "non-alphabetic symbol and the non-alphabetic symbol" and insert
-- non-alphabetic symbol, and the non-alphabetic symbol --, therefor.

Column 12, Line 19:
In Claim 5, after "claimed" insert -- in --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*